United States Patent [19] [11] 4,051,839
Petry [45] Oct. 4, 1977

[54] LIME BREAKUP MEANS

[75] Inventor: Stanton H. Petry, Arlington Heights, Ill.

[73] Assignee: Cory Food Services, Inc., Chicago, Ill.

[21] Appl. No.: 661,844

[22] Filed: Feb. 27, 1976

[51] Int. Cl.² .................................................. F24H 1/00
[52] U.S. Cl. .................................. 126/344; 15/104.05; 134/166 C; 210/497.1
[58] Field of Search ........................... 126/344, 350 R; 210/497.1; 134/166 R, 166 C; 165/95; 15/104.05

[56] References Cited

U.S. PATENT DOCUMENTS

| 2,146,022 | 2/1939 | Losee | 126/344 |
| 2,299,053 | 10/1942 | Ferris | 126/344 |
| 2,467,749 | 4/1949 | Hoosdon | 126/344 |
| 3,473,961 | 10/1969 | Heeren et al. | 165/95 |
| 3,919,732 | 11/1975 | Honma et al. | 165/95 |

Primary Examiner—John J. Camby
Assistant Examiner—Larry I. Schwartz
Attorney, Agent, or Firm—Wegner, Stellman, McCord, Wiles & Wood

[57] ABSTRACT

A hot water heater having a heating tank and a superjacent basin for receiving cold water to be delivered to the tank. A duct is provided leading from the basin into the tank for transferring water from the basin to the tank. A heater is provided for heating the water in the tank. Structure is provided in the duct for breaking up lime which may form at the upper level of the water in the tank and cut as a result of a continued heating of the water therein. The lime breakup structure includes a float and a retaining cage for controlling the movement of the float during delivery of cold water from the basin through the duct to the tank. The cage and float are removably carried in the hot water heater for facilitated installation and maintenance.

8 Claims, 6 Drawing Figures

U.S. Patent   Oct. 4, 1977   4,051,839
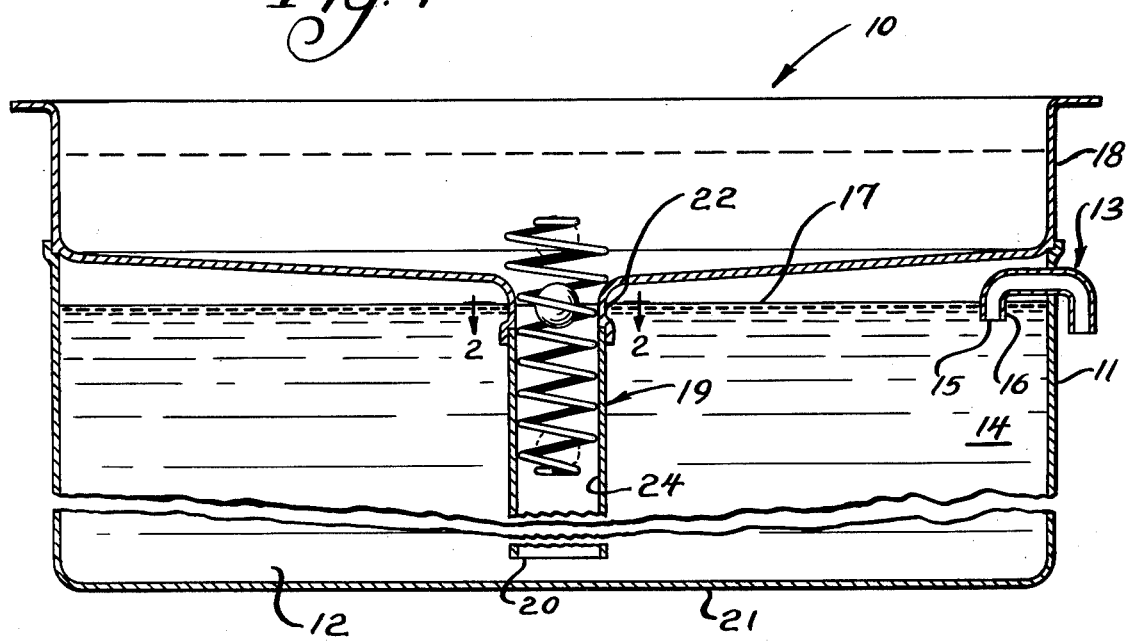
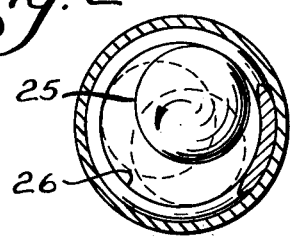
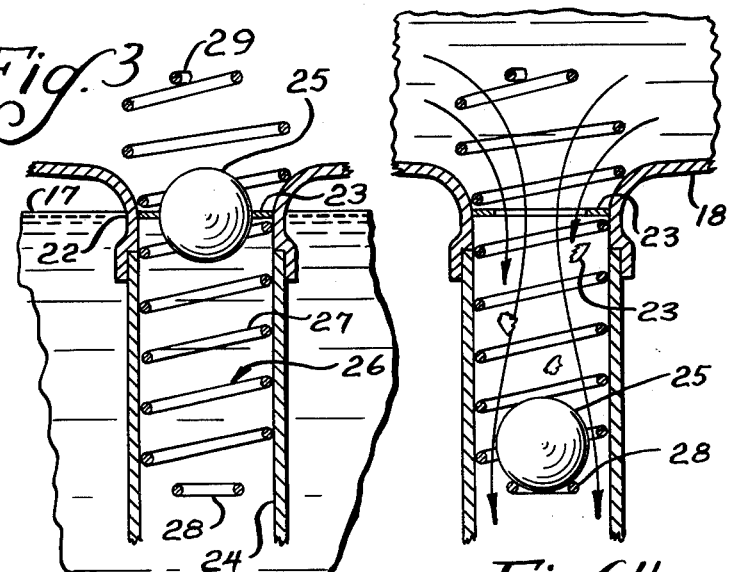
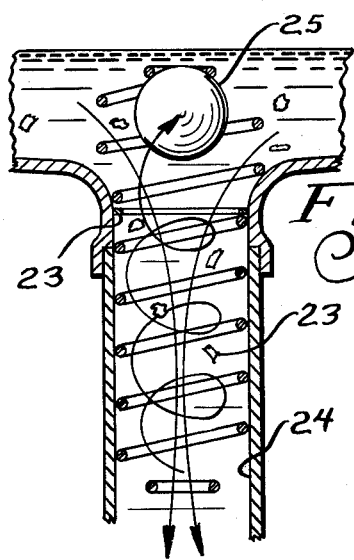
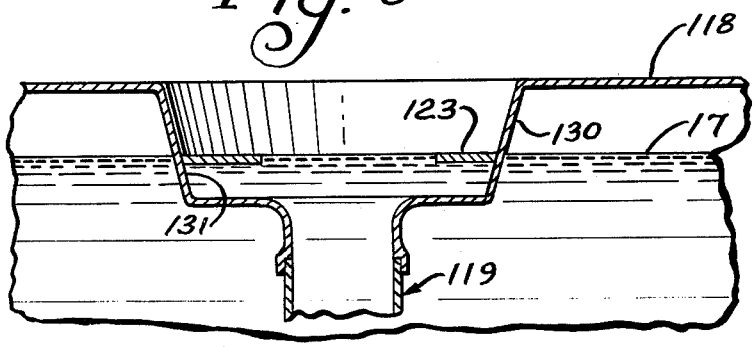

LIME BREAKUP MEANS

BACKGROUND OF THE INVENTION

1. Field of the Invention

This invention relates to hot water heaters and in particular to means for preventing blockage of flow through an inlet duct by lime formation at an upper level of water therein.

2. Description of the Prior Art

In Pat. No. Re. 21,393, of Joseph S. Losee, an electric water heater is shown wherein a basin is mounted above a heating tank with a delivery tube extending downwardly from the basin into the heating tank. The outlet from the heating tank is defined by a siphon which has an inlet opening into the upper portion of the tank. A heating element is provided in the lower portion of the tank for maintaining the water in the tank at a preselected high temperature. As shown in the patent, the water level during the water heating operation may be within a portion of the transfer duct below the basin.

It has been found that continual heating of water in such a water heater causes lime to form at the upper level of the water and, thus, lime may form across the transfer duct from the basin to the tank. Where such lime formation is permitted to accumulate over a substantial period of time, the lime blocks the transfer duct preventing proper operation of the water heater.

Such hot water heaters may be utilized in brewing apparatuses, such as for brewing coffee and the like. One excellent example of such a brewing apparatus is shown in U.S. Pat. No. 3,366,034, of Harvey R. Karlen et al, owned by the assignee hereof. Such brewing apparatuses may be installed in offices and the like and it is important to prevent overflowing of the basin as might result from the blockage of the transfer duct from the basin to the tank when cold water is being poured into the basin to displace a corresponding quantity of hot water previously heated in the tank outwardly through the siphon discharge duct to the brewing cartridge.

SUMMARY OF THE INVENTION

The present invention comprehends an improved means for preventing blockage of a flow passage between an upper basin and a lower heating tank in a hot water heater wherein the heating means are arranged to maintain the water in the heating tank at a preselected high temperature. More specifically, the invention is directed to the use of such improved flow blockage preventing means in a beverage brewer or the like.

In the illustrated embodiment, the means for preventing blockage of the flow passage includes a float and a retainer for movably holding the float in the flow passage while permitting free flow of water through the retaining means. The retaining means is arranged to retain the float vertically movably at the upper water level whereat lime may be formed by the continual heating of the water in the heating tank.

The retaining means may comprise a cage. In the illustrated embodiment, the retaining means comprises a helical wire cage defining means for imparting a swirling action to the water flowed downwardly through the transfer passage so as to provide improved dynamic action of the float in breaking up lime formation at the upper water level.

The float may comprise a ball float and may be formed of suitable synthetic resin with the retainer cage being formed of a suitable material, such as stainless steel.

The cage may be removably secured in the duct means so as to extend to above and below the upper water level, thereby permitting vertical movement of the float to above and below the upper water level during delivery of water from the basin through the flow passage into the tank.

It has been found that the provision of such a float at the upper water level permits the incoming water from the basin to effect a dynamic movement of the float vertically in the flow passage from and to the upper water level to break up formed lime at that level. The use of the incoming water to effect the desired movement of the float provides an improved hydraulic activation of the float in effecting the desired lime breakup.

By causing the float to move spirally, a further improved breakup of the lime is effected.

In the illustrated embodiment, the flow of water from the basin into the tank initially causes the float to move downwardly to provide a central opening in the flow passage notwithstanding the formation of lime at the normal float level. The buoyancy of the float causes the float to move upwardly against the incoming flow during a subsequent portion of the water transfer from the basin to the tank and by virtue of a spiral movement of the float at that time, provide an effective breakup of lime formation at the normal water upper level.

The float may move to above the normal water upper level during the water transfer from the basin to the tank and subsequently back down to the upper water level at the termination of water delivery.

By virtue of the improved lime breakup means, improved trouble-free operation of the hot water heater and beverage brewer may be obtained with minimum service and maintenance requirements.

The lime breakup means of the present invention is adapted for facilitated installation in the hot water heater and, thus, is adapted for use in existing hot water heaters wherein a lime formation flow blockage problem exists.

The blockage-preventing means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary diametric section of a hot water heating having a blockage-preventing means embodying the invention;

FIG. 2 is an enlarged horizontal section taken substantially along the line 2—2 of FIG. 1;

FIG. 3 is a fragmentary enlarged vertical section illustrating the disposition of the float at the upper water level with lime formation extending between the float and duct walls;

FIG. 4 is a vertical section illustrating the downward movement of the float by the initial flow of water from the basin to the tank;

FIG. 5 is a vertical section illustrating the movement of the float to the top of the retaining means during a subsequent portion of the water delivery and showing schematically a spiral movement of the float from the lower position to the upper position for effectively breaking up the lime formation; and FIG. 6 is a fragmentary vertical section illustrating a modified form of means for preventing blockage of the transfer flow passage by lime formation at the upper water level of the hot water heater.

DESCRIPTION OF THE PREFERRED EMBODIMENTS

In the exemplary embodiment of the invention as disclosed in FIGS. 1-5 of the drawing, a hot water heater generally designated 10 comprises a heating tank 11 provided with a suitable conventional heating coil 12. Hot water may be delivered from the tank 11 through a gooseneck siphon discharge duct 13 extending through the tank wall adjacent an upper level thereof. The hot water 14 is normally maintained within the heating tank between a level defined by the lower end 15 of the inlet portion 16 of the discharge duct 13 and a maximum upper level 17 to which the water in the tank 11 rises as a result of the expansion thereof by the heating of the water in the tank.

As shown in FIG. 1, water may be delivered to the heating tank from a basin 18 into which the water may be poured from a suitable container, such as a coffee decanter. The water flows from basin 18 downwardly through a transfer duct generally designated 19 to a lower end 20 adjacent the bottom wall 21 of the tank. Lower end 20 of the transfer duct is normally open so that the water level 17 in the tank is also maintained within the duct 19 in an upper portion 22 thereof.

Referring now to FIG. 3, as a result of continual heating of the water 14 in tank 11, lime 23 may form at the upper level 17 of the hot water as a result of the vaporization of water at this level in duct portion 22. Heretofore, this lime formation has caused a serious and vexatious problem in that it effects a blockage of the flow passage 24 through duct 19 presenting a serious and maintenance problem and potentially causing overflow of the basin 18 by poured-in cold water.

The present invention provides an improved means for preventing such blockage of the flow passage more specifically including a float 25 and a retaining means 26 for retaining the float for vertical movement at the water level 17 in flow passage 24.

More specifically, float 25 may comprise a ball float which may be formed of a suitable material, such as synthetic resin. One excellent example of such a float is one formed of polypropylene synthetic resin.

The retaining means may comprise a helical cage 27 having reduced diameter end portions 28 and 29 whereby the ball float 25 is captured within the cage for limited vertical movement.

As best seen in FIGS. 2 and 3, the ball float 25 has a diameter substantially less than the diameter of the flow passage 24 and the turns of the cage 27 are substantially open to permit relatively free movement of water downwardly through the flow passage 24 through the cage and around the float.

As shown in FIG. 3, float 25 is normally disposed at the water level 17 so that the lime formation 23 may extend only from the duct wall to the float. As shown in FIG. 4, the initial force of the incoming cold water from basin 18 breaks the float free of the lime formation 23 and forces the float downwardly to the lower portion 28 of the retainer cage. The breaking free of the float 25 from the lime formation may, at that time, break portions of the lime formation 23 free.

As the force of the downward flow decreases during the subsequent transfer from basin 18 downwardly through flow passage 24, the float may rise upwardly through the cage and, in doing so, pass the lime formation 23. As shown in FIG. 5, the upward movement of the float may be accompanied by a spiral, or swirling movement of the float tending to knock free remaining portions of the lime formation 23 so as to effectively remove the lime formation from the flow passage.

The final downward movement of the float during the terminal portion of the water delivery from basin 18 to the tank 11 may also be accompanied by a spiral movement of the float to effectively assure a substantial removal of the lime formation 23 from the flow passage.

The vortex-type flow of the water downwardly from basin 18 through flow passage 24 may be enhanced by the helical configuration of the retainer cage 27 to provide an effectively positive removal of the lime formation 23 from the flow passage.

Thus, the operation of the lime breakup means comprises an improved facilitated hydraulic actuation of a breakup element by forces generated by the provision of the replacement cold water supply in basin 18.

The breakup means defined by the float and retainer cage may be readily installed in the hot water heater, and in the illustrated embodiment is readily installed in the transfer duct 19 to permit the desired movement of the float to below and above the normal upper water level 17 in the hot water heater. Thus, the lime breakup means of the present invention is adapted for facilitated installation in existing hot water heaters wherein the lime formation across the flow passage 24 presents an undesirable condition.

Referring now to FIG. 6, a modified form of structure for preventing flow blockage of the duct 119 is shown to comprise an enlarged upper portion 130 of the duct having a large diameter flow passage cross section as at portion 131 corresponding to the upper water level 17. Thus, the lime formation 123 at portion 131 must be substantially greater to effect a complete bridging of the flow passage. In the embodiment of FIG. 6, the normal turbulence of the incoming flow of the cold water from basin 118 may effectively break up the lime formation 123 without the need for further hydraulic means. In the embodiment of FIG. 6, the enlarged flow passage portion 131 is defined by a portion of the bottom wall of the basin extending downwardly to below the water level 17.

In normal use, the operation of the hot water heater may be such as to cause relatively continuous breakup of any rudimentary lime deposits before they reach any substantial size, thus effectively preventing a lime deposit problem. In this sense, the present invention not only serves as a means for breaking up formed lime, but also as means for effectively preventing the buildup of formed lime.

In a number of brewer installations utilizing the improved lime control means of the present invention wherein lime buildup had previously been found to occur in approximately two to three weeks, continuous lime-free operation of the brewers for over five months has resulted. Thus, the present invention provides highly improved maintenance-free operation of such brewers with respect to the vexatious lime problem.

The foregoing disclosure of specific embodiments is illustrative of the broad inventive concepts comprehended by the invention.

I claim:

1. In a hot water heater having a heating tank, heating means for heating water in said tank, an outlet from the tank, and duct means defining an inlet flow passage extending downwardly into said tank for delivering water into a lower portion of said tank to be heated therein, improved means for preventing blockage of said flow passage by lime forming across the flow passage at the upper level of the water in the heating tank and flow passage as the result of heating thereof, said blockage prevening means comprising: a float having a horizontal cross section smaller than that of said flow passage; and cage means movably holding said float in said flow passage while permitting free flow of water downwardly therethrough, the float being vertically movably disposed at said upper water level in said flow passage.

2. The hot water heater structure of claim 1 wherein said cage means comprises a helical wire cage.

3. The hot water heater structure of claim 1 wherein said float comprises a ball float.

4. The hot water heater structure of claim 1 wherein said float comprises a ball float formed of a synthetic resin.

5. The hot water heater structure of claim 1 wherein said float comprises a ball float of polypropylene synthetic resin.

6. The hot water heater structure of claim 1 wherein said cage means is formed of stainless steel.

7. The hot water heater structure of claim 1 wherein said cage means is secured to said duct means.

8. The hot water structure of claim 1 wherein said cage means extends to above and below said upper water level to permit vertical movement of the float to above and below said upper water level during delivery of water downwardly through said flow passage into said tank.

* * * * *